(12) United States Patent
Frank

(10) Patent No.: US 7,217,205 B2
(45) Date of Patent: May 15, 2007

(54) COMPACT INLINE LONGITUDINAL CVT

(75) Inventor: Andrew A. Frank, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/947,544

(22) Filed: Sep. 21, 2004

(65) Prior Publication Data

US 2005/0107193 A1   May 19, 2005

Related U.S. Application Data

(60) Provisional application No. 60/508,083, filed on Oct. 1, 2003, provisional application No. 60/514,436, filed on Oct. 25, 2003.

(51) Int. Cl.
  *F16H 59/00* (2006.01)
(52) U.S. Cl. ...................... 474/28
(58) Field of Classification Search ............ 474/8, 474/18, 27, 28, 84, 87, 88
  See application file for complete search history.

(56) References Cited

U.S. PATENT DOCUMENTS

| 583,402 A | 5/1897 | Reeves | |
| 2,433,150 A * | 12/1947 | Palm | 474/35 |
| 4,259,874 A * | 4/1981 | Guirriec | 474/28 |
| 4,484,901 A * | 11/1984 | Toti et al. | 474/28 |
| 4,672,863 A | 6/1987 | Itoh et al. | |
| 5,470,285 A | 11/1995 | Schneider et al. | |
| 6,213,907 B1 | 4/2001 | Wooden | |
| 6,280,357 B1 | 8/2001 | Van Spijk | |
| 6,293,888 B1 | 9/2001 | Moon | |
| 6,537,175 B1 * | 3/2003 | Blood | 477/44 |

OTHER PUBLICATIONS

Luk Automotive Systems, "LuK Innovation—LuK CVT Components", 5 page brochure dated Jun. 2000.

* cited by examiner

*Primary Examiner*—Vicky A. Johnson
(74) *Attorney, Agent, or Firm*—John P. O'Banion

(57) ABSTRACT

A series inline continuously variable transmission (SICVT) in which two series coupled continuously variable transmissions are in an inline configuration is provided to be used in rear-wheel drive vehicles. Two sets of pulleys are connected in series to square the reduction and bring the input and output shafts inline. The input and output pulleys are configured for actuation by hydraulic pistons for shifting, while the idler pulley set may be implemented without a need for actuation. Displacement of the actuated pulleys results in the square of the original ratio change. The SICVT is compact and efficient, and can be used in all types and sizes of vehicles including gasoline and diesel powered vehicles and electric, fuel cell electric, and all types of hybrid electric vehicles. Additional CVT stages can be provided for further reduction in size.

51 Claims, 7 Drawing Sheets

COMPACT INLINE LONGITUDINAL CVT

CROSS-REFERENCE TO RELATED APPLICATIONS

This application claims priority from U.S. provisional application Ser. No. 60/508,083 filed on Oct. 1, 2003, incorporated herein by reference in its entirety, and from U.S. provisional application Ser. No. 60/514,436 filed on Oct. 25, 2003, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to continuously variable transmissions, and more particularly to a compact inline continuously variable transmission.

2. Description of Related Art

A Continuously Variable Transmission (CVT) is a type of transmission that can be traced to the 1800's. An early example can be found in U.S. Pat. No. 583,402 which is incorporated herein by reference in its entirety. Examples of more modern CVTs can be found in the following U.S. patents, which are also incorporated herein by reference in their entirety: U.S. Pat. No. 5,470,285; U.S. Pat. No. 6,293,888; U.S. Pat. No. 6,213,907; and U.S. Pat. No. 6,280,357.

Continuously variable transmissions generally utilize a pair of adjustable pulleys, including a primary pulley and a secondary pulley. The primary pulley is connected to the prime mover (e.g., an engine) and the secondary pulley is connected to the drive train of the vehicle, typically through a clutch. Generally, a drive belt interconnects the pulleys and transfers power from the primary pulley to the secondary pulley by means of frictional contact between the drive belt and the pulleys. Typically, each pulley is constructed from two flanges and each flange has a conical side surface to define a generally V-shaped gap between the flanges. At least one of the flanges is movable along the axis of the shaft to allow the gap between the flanges to be varied. The transmission ratio of the CVT can be varied by changing the effective gap width between the flanges of the two pulleys. Doing so varies the radial position of the drive belt in each pulley, thereby allowing for continuous adjustment of the drive ratio between the shafts and, therefore, between the engine and the drive train.

Movement of the flanges is achieved generally through a hydraulic servo, or other mechanical or electromechanical means, which controls the force on the belt or chain. Increasing fluid pressure causes more fluid to displace the flange to move axially and thus increases the effective diameter of the pulley. As fluid pressure is decreased, the flange moves along the shaft in the opposite direction due to the tension on the belt, thus decreasing the effective diameter of the pulley. Generally, the effective diameter of the primary pulley is moved in one direction as the effective diameter of the secondary pulley is moved in the opposite direction.

Most vehicles using CVTs employ a non-inline transaxle configuration similar to that schematically shown as 10 in FIG. 1. However, with the development of high torque chain elements for the CVT, placement in longitudinal vehicle powertrain orientations is unavoidable for the reason that most high torque vehicles are front engine and rear-wheel drive. However, typical CVTs with a ratio range of five or six have a pulley set with overall dimensions larger than the tunnel of the vehicle, and input and output shafts that are ten inches or more apart. These characteristics make implementation in rear-wheel drive vehicles difficult or impossible. In an automobile installation, space constraints limit the volume into which a transmission can be installed and thus limit the availability of using a belt or chain type CVT. Because a typical CVT utilizes a pulley assembly constructed from two pulleys positioned on parallel shafts and linked with a belt or chain, the minimum width required to install a CVT is determined by the size of the belt and pulley assembly. Rear wheel drive automobiles, however, offer only limited space in the transmission tunnel for the installation of a transmission, especially because the transmission tunnel in such automobiles is underneath the forward section of the passenger compartment. Typically, this space provides greater length than height or width.

Therefore, CVT configurations must be sufficiently compact and efficient to allow for practical use in rear-wheel drive vehicles. Such designs would necessarily have coaxial input and output shafts for placement in longitudinal configurations. However, conventional CVT designs using a combination of chains and gear sets to produce co-axial input and output shafts decrease efficiency and are still no smaller than the wide ratio range CVT pulley set. Toroidal CVT applications have good size properties, but are low in efficiency and much more complicated and are difficult to control and manufacture.

Another approach can be seen in U.S. Pat. No. 5,470,285, incorporated herein by reference in its entirety. In one disclosed arrangement, the power input shaft to the CVT system is coaxial with a power output shaft from the CVT system; that is, the axis of the power input shaft is in the same longitudinal direction as the axis of the power output shaft. Such a configuration allows the CVT to be installed into a rear-wheel drive automobile configured to use a conventional multi-gear transmission without requiring modification to the transmission tunnel or to the drive train. While the foregoing inline CVT configuration is compact, the configuration is complicated and decreases efficiency. U.S. Pat. No. 4,672,863 discloses a CVT connected to an auxiliary transmission, but configuration does not address the need for a compact assembly for rear-wheel drive vehicles.

Therefore, there is a need for a new CVT configuration that is sufficiently compact and efficient to allow for practical use in rear-wheel drive vehicles, including heavy duty vehicles. The present invention satisfies those needs, as well as others, and overcomes limitations in conventional longitudinal CVT configurations.

BRIEF SUMMARY OF THE INVENTION

The present invention overcomes limitations of conventional longitudinal CVT configurations by employing a series inline configuration. The series inline continuously variable transmission (SICVT) configuration of the present invention can serve as a direct replacement for a longitudinal transmission in practically any vehicle (including a heavy duty vehicle). Furthermore, the present invention is applicable to both conventional and hybrid vehicles.

By way of example, and not of limitation, according to an aspect of the invention an SICVT comprises at least two CVT stages which are connected in series. In one beneficial embodiment, two CVT stages are employed and the corresponding two sets of pulleys are connected in series and the input and output shafts are brought inline. The result is that smaller pulleys can be used because the overall ratio range of the series configuration is the product of the ratio ranges of the individual CVT stages (e.g., the square of the individual ratios where two stages are employed). By using smaller pulleys, each of which having a smaller ratio range, and by bringing the input and output shafts inline, the SICVT of the present invention is more compact and efficient than conventional designs. The series design allows the use of low ratio range sets and provides a significant reduction in transmission volume (approximately equivalent to a manual transmission). The additional benefit of low ratio range pulley sets can result in an increase in efficiency.

Beneficially, according to another aspect of the invention, the pulleys in an SICVT can be smaller than in a non-inline configuration. For a desired overall ratio range, the ratio range of the individual CVT stages in a two stage SICVT according to the invention is the square root of the desired overall ratio range. Hence, a square root reduction in pulley size is achieved. This can be seen by the relationship R=R1*R2 where R is the overall ratio range and R1 and R2 are the ratio ranges of the first and second stage R=9:1, then R1 and R2 each equal 3:1. Hence, the ratio and corresponding pulley size for each stage is reduced. In addition, piston displacement to control ratio is the square root of that with a single pulley system because each sheave moves a smaller amount of fluid and the total amount of fluid that must be pumped is less.

More particularly, one of the advantages of the SICVT is that a wide overall ratio span can be achieved with a very small movement of the clamping pistons and a small movement of the chain. The motion is approximately inversely proportional to the square root of the ratio, and it can be accomplished with much smaller diameter pulleys. The reason for this is that the ratio of the first chain and pulley set is multiplied by the ratio of the second chain and pulley set. Thus, the maximum ratio span is the product of the ratio spans of the two pulley sets. This means that a small change in dimensions can make the square of the ratio change of a single pulley set CVT system. Thus an SICVT can be much more compact than a single pulley and chain system for the same span of ratios. It should be noted that if both CVT stages in an SICVT use the same chain size, the input torque rating is a little less for the SICVT than for a single stage CVT. However, a slightly larger chain would provide similar torque ratings. Also, smaller SICVT can be spun faster than an equivalent single stage CVT so the power rating may be the same or greater.

In one embodiment, a chain is used to couple the pulleys in each pulley set and the load on the chain coupling one of the pulley sets is greater than the load on the chain coupling the other pulley set. For example, with a 1.5 reduction, one of the chains is loaded 1.5 times that of the other chain. Such a mismatch can occur without penalty or inefficiency by using, for example, a high efficiency van Rooij type chain to couple the pulleys. However, other chains such as a Luk type chain can be used to couple the pulley sets, and belts such as a van Doorne type belt can be used instead of a chain.

It can be seen, therefore, that according to an aspect of the invention, a continuously variable transmission apparatus comprises at least two series coupled continuously variable transmission stages wherein the series coupled continuously variable transmission stages have an input shaft and an output shaft, and wherein the output shaft is positioned inline with the input shaft. In one embodiment, each continuously variable transmission stage has a primary pulley and a secondary pulley, the primary pulley of the first continuously variable transmission stage has the input shaft, the secondary pulley of the second continuously variable transmission stage has the output shaft, and the primary pulley of the second continuously variable transmission stage is connected to the secondary pulley of the first continuously variable transmission stage.

According to another aspect of the invention, a continuously variable transmission apparatus comprises a first continuously variable transmission stage, a second continuously variable transmission stage, wherein each continuously variable transmission stage has a primary pulley and a secondary pulley, wherein the primary pulley of the first continuously variable transmission stage has an input shaft, wherein the secondary pulley of the second continuously variable transmission stage has an output shaft, wherein the primary pulley of the second continuously variable transmission stage is connected to the secondary pulley of the first continuously variable transmission stage, and the output shaft is positioned inline with the input shaft.

In accordance with a further aspect of the invention, there is described a continuously variable transmission apparatus comprises first and second continuously variable transmission stages, wherein each continuously variable transmission stage has a primary pulley and a secondary pulley, wherein the primary pulley of the second continuously variable transmission stage is connected to the secondary pulley of the first continuously variable transmission stage, wherein the primary pulley of the first continuously variable transmission stage has an input shaft, wherein the secondary pulley of the second continuously variable transmission stage has an output shaft, and wherein the output shaft is positioned inline with the input shaft.

According to a still further aspect of the invention, a continuously variable transmission apparatus comprises first and second continuously variable transmission stages, wherein each continuously variable transmission has a pulley configured for actuation by a hydraulic piston or other mechanical or electromechanical means, and further has an idler pulley, wherein the idler pulley of the second continuously variable transmission stage is coupled to the idler pulley of the first continuously variable transmission stage through a common shaft, wherein the actuated pulley of the first continuously variable transmission stage is coupled to an input shaft, wherein the actuated pulley of the second continuously variable transmission stage is coupled to an output shaft, and wherein the output shaft positioned inline with said input shaft.

According to another aspect of the invention, a continuously variable transmission apparatus comprises a first control pulley configured for actuation by a hydraulic piston or other mechanical or electromechanical means and coupled to an input shaft, a first idler pulley coupled to the first control pulley, a second control pulley configured for actuation by a hydraulic piston or other mechanical or electromechanical means and coupled to an output shaft, a second idler pulley coupled to the second control pulley, wherein the second idler pulley is coupled to the first idler pulley by a shaft and common parts, and wherein the output shaft is positioned inline with the input shaft.

Additionally, in some vehicle applications, it may not be necessary or desirable to position the output shaft inline with the input shaft; instead, a degree of axial offset may be acceptable or desired. Accordingly, another aspect of the invention is the series connection of a plurality of CVT stages wherein the output shaft is axially offset from the input shaft.

An object of the invention is to provide a SICVT module having approximately the same size and weight as a manual transmission for the same torque and power capabilities.

Another object of the invention is to provide a SICVT module that can be fitted with a torque converter and reverse gear module for conventional drives.

Another object of the invention is to provide a SICVT module that can be fitted with an electric motor for reverse and hybrid electric drive.

Another object of the invention is to provide a SICVT module that is compatible with means for starting a vehicle such as hydraulic drives or flywheels.

Another object of the invention is to provide a SICVT module that can be fitted to large vehicles such as buses and trucks.

Another object of the invention is provide an automatic SICVT module that can be manufactured from only a few common parts.

Another object of the invention is to provide a SICVT module that can be scaled for any vehicle from small sports cars to class 7 and 8 trucks.

Another object of the invention is to provide an automatic SICVT module that has high efficiency.

Further aspects and objects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Figure 1:
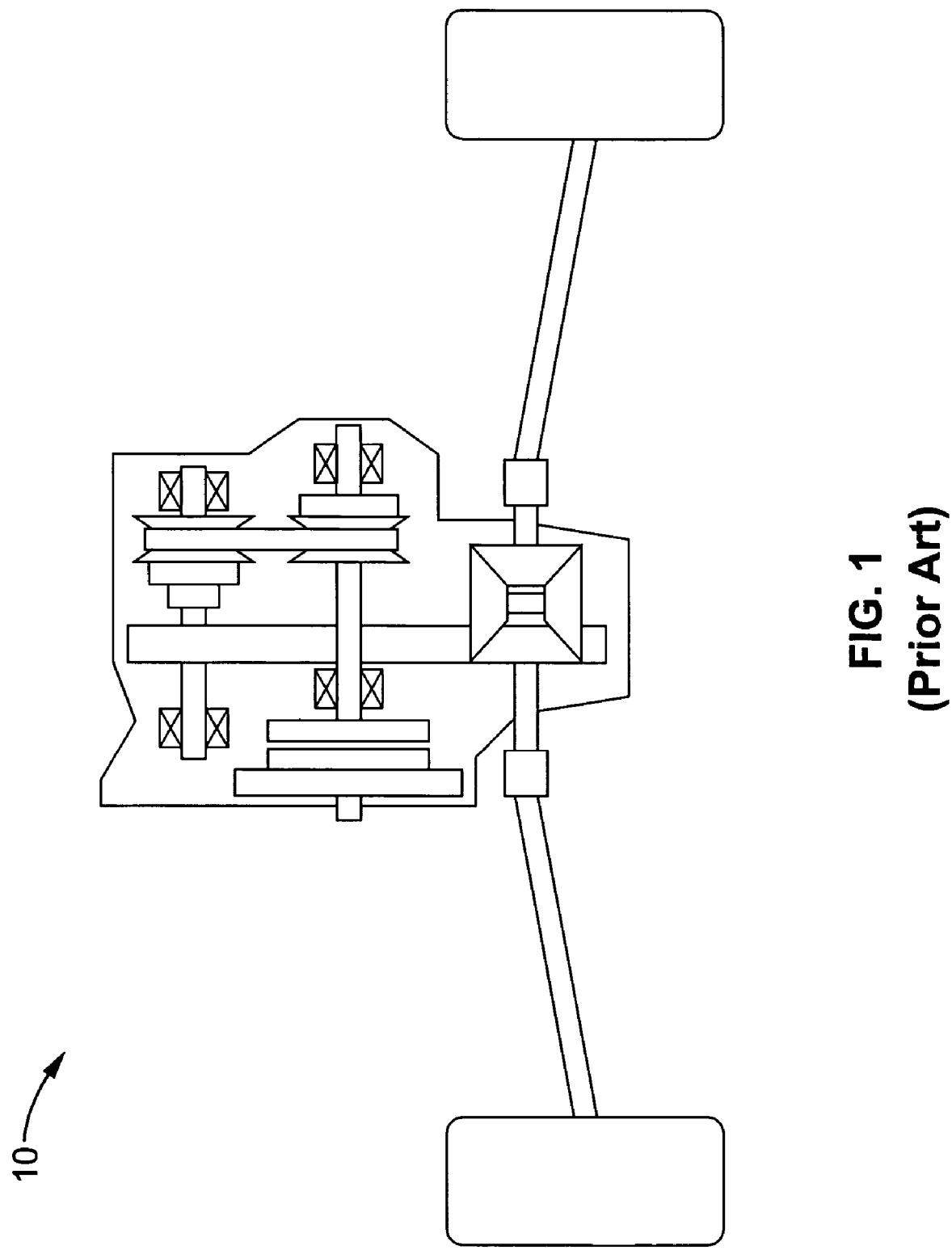
FIG. 1 is a schematic diagram of a conventional transaxle (longitudinal) CVT.
Figure 2:
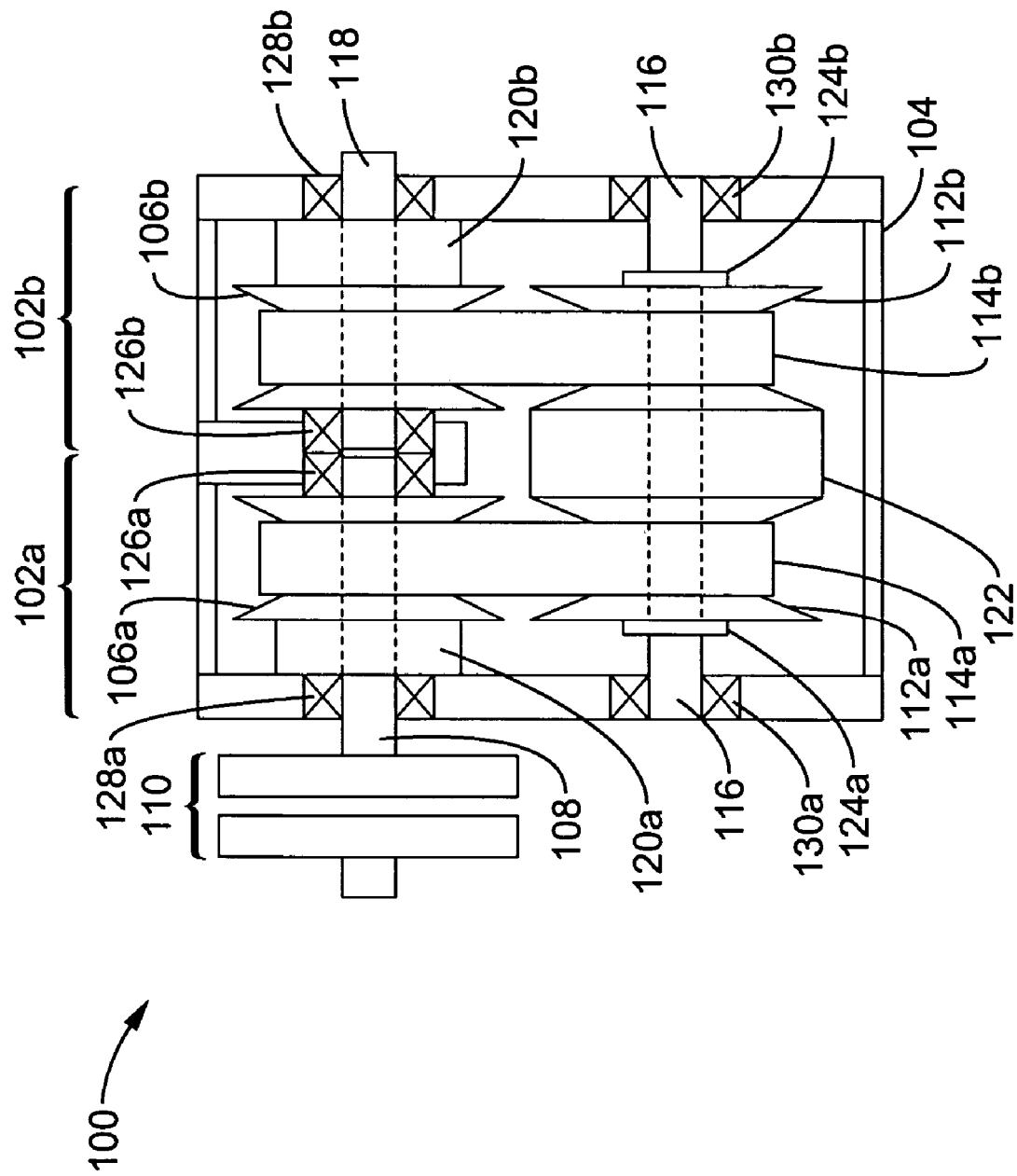
FIG. 2 is a schematic diagram of an embodiment of a two stage SICVT according to the present invention.

FIG. 2 schematically shows an embodiment of a series inline continuously variable transmission (SICVT) module 100 according to the present invention. In the embodiment shown in FIG. 2, a pair of identical continuously variable transmission (CVT) stages 102a, 102b are positioned side by side in a housing 104 and connected in series.

In the configuration shown, a first CVT stage 102a has a control (actuated) pulley 106a which is carried by a shaft 108 for connection to a prime mover directly or through a clutch assembly 110 (or other starting device such as a torque converter or an electric motor). CVT 102a also has an idler pulley 112a to which control pulley 106a is rotatably coupled using a drive means 114a such as a van Rooij type chain, a Luk type chain, a van Doorne type belt, or other like chain or belt known in the art. A von Rooij chain, manufactured by Gear Chain Industries, is preferred since it is more efficient and durable than other chains or belts.

The second CVT stage 102b has the same configuration as first CVT stage 102a. The output of the first CVT stage 102a is connected in series with the input of the second CVT stage 102b through a shaft 116 which carries idler pulleys 112a, 112b. The output of the SICVT module 100 is taken from shaft 118 which carries control (actuated) pulley 106b of second CVT stage 102b.

The control pulleys 106a, 106b are actuated by means of control pistons 120a, 120b, respectively. Preferably, labyrinth seals are used with the pistons since the pressures are high by conventional transmission standards. Additionally, labyrinth seals have very little drag and will typically last indefinitely since there is no wear.

The control pulleys are typically splined to their respective shafts so that their sheaves can slide back and forth but not rotate. These pulleys are designed with a large diameter to reduce the friction loads and eliminate the need for rolling ball contacts. CVT shift rates are very slow in general and are implemented by high-pressure hydraulics so that there is no need for low friction shifting components. The clamping forces required by the coefficient of traction are so high that the moving sheaves can easily overcome the friction and move accurately. To help this movement, the asymmetrical chain load on the sheaves cause a natural oscillating motion on the sheaves reducing the friction to movement to a negligible amount.

An idler pulley wheel 122 is provided between idler pulleys 112a, 112b, and slides along shaft 116 in response to the clamping pressure applied to control pulleys 106a, 106b by pistons 120a, 120b since the changes in clamping pressure in turn alter the width of the chains or belts. In one embodiment, the idler pulley wheel 122 and shaft 116 are splined or keyed to prevent rotation of idler pulley wheel 122 in relation to shaft 116.

In one embodiment, a common shaft 116 couples idler pulley 112a of CVT 102a to idler pulley 112b of CVT 102b. In this embodiment, idler pulleys 112a, 112b are, for example, pressed onto shaft 116. Stops 124a, 124b are affixed to shaft 116 to prevent movement of idler pulleys 112a, 112b along shaft that could result from the lateral force exerted on the idler pulleys by chains or belts 114a, 114b. Alternatively, idler pulleys 112a, 112b could be welded to shaft 116 or coupled to shaft 116 in another conventional manner. In a further embodiment, the idler pulleys and shaft could be an integrated unit.

Conventional bearings are employed for rotation as shown. Preferably, shaft 108 is supported by a roller bearing 126a and ball bearing 128a that prevents the shaft from moving side to side. Similarly, shaft 118 is supported by a roller bearing 126b and a ball bearing 128b. On the other hand, the ends of shaft 116 are supported by roller bearings 130a, 130b, respectively. By using roller bearings, shaft 116 is allowed to move side to side in response to the forces applied by the control pistons to reduce the amount of stress on the idler pulleys. Typically, the amount of travel is only a few millimeters. In other words, the forces on the idler pulleys are balanced so that the roller bearings have no longitudinal axial shaft loads.

Note that, while the above description uses the terminology "control pulleys" and "idler pulleys", the pulleys can also be referred to as "primary" and "secondary" pulleys depending on the specific position in the module. Using such terminology, since the CVTs are connected in a series configuration, control pulley 106a is a primary pulley, idler puller 112a is a secondary pulley, idler pulley 112b is a primary pulley, and control pulley 106b is a secondary pulley. Hence, in a series configuration, the secondary pulley of one stage is connected to the primary pulley of a subsequent stage.

Also note that, unlike a conventional CVT, there is no need to include pistons to control the idler pulleys 112a, 112b since the forces are transmitted directly from the chain or belt in the first stage to the chain or belt in the second stage. The clamping forces for the two chains or belts are also transmitted from the first stage to the second stage.

For example, in maximum reduction, the first stage chain and pulleys are loaded to transmit a given torque. The second stage chain and pulleys are then transmitting a higher torque and consequently must be loaded higher. Thus, to have the transmission work effectively, the first stage chain should be loaded the same as the second stage chain. Fortunately, the van Rooij chain is not as sensitive in efficiency to the clamping load as other chain and belt concepts. Thus the first stage chain can be underloaded slightly in maximum reduction and not suffer much loss in efficiency. The same becomes true in minimum ratio overdrive since the output torque will become considerably less; thus, for a given rated input torque, the second stage chain and pulley set is overloaded.

Such control pistons could be included if desired, but are not necessary due to the use of an idler pulley wheel 122 that slides along shaft 116 in response to control pulleys 106a, 106b. The need to only actuate the input and output pulleys mitigates the potential production cost increase over a single stage design. The idler pulley set 112a, 112b can be purely mechanical with no hydraulics involved, and the close proximity of the input 120a and output 120b pistons may significantly reduce hydraulic system complexity. However, it may be possible to improve efficiency by actuating the idler pulleys 112a, 112b in the same manner as the control pulleys. Also, the outer diameter of the shafts can also be reduced which will decrease the material cost and machining time.

Except as described above, the two CVTs employed are of a conventional mechanical design known in the art, the details of which are not described herein.

Figure 3B:
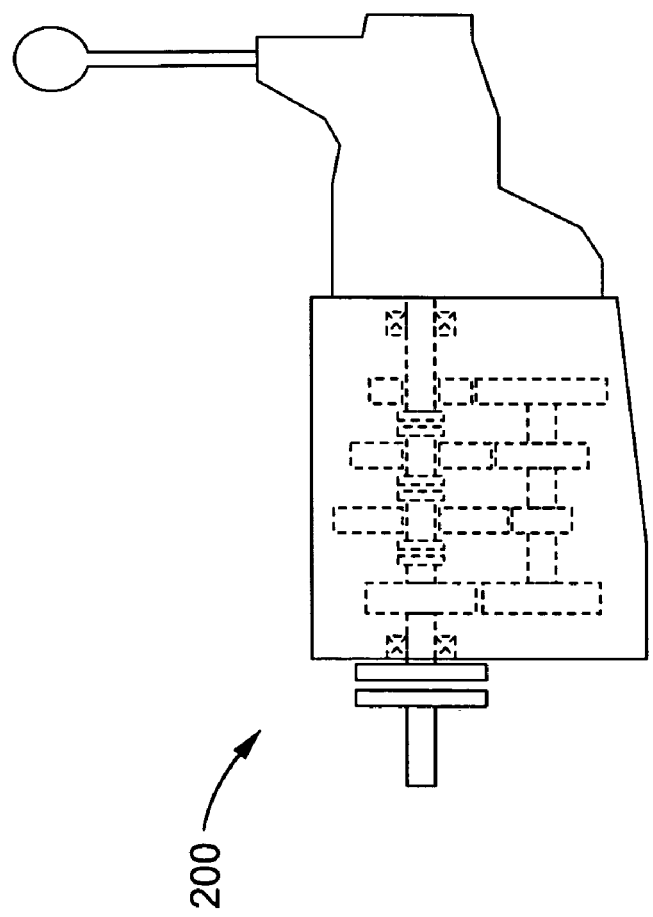
FIGS. 3A and 3B are schematic diagrams comparing the SICVT of FIG. 2 (FIG. 3A) to a conventional manual transmission (FIG. 3B).
Figure 3A:
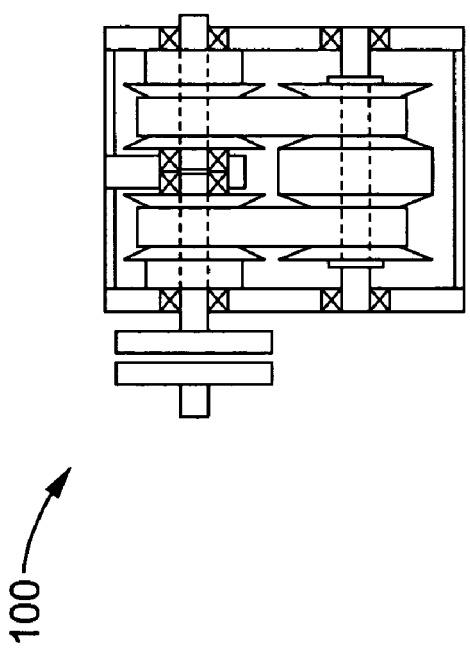

By connecting two CVTs with small ratio ranges in series as described above, two problems are solved simultaneously; namely, the input and output shafts are brought inline, and the overall lateral dimensions are reduced significantly. Referring to FIG. 3A and FIG. 3B, an SICVT 100 and equivalent manual transmission 200 are compared to demonstrate approximate relative scale and orientation. In actual construction, an SICVT having comparable power and torque as a manual transmission is smaller in width about the same length for the same span of ratios.

Figure 4:
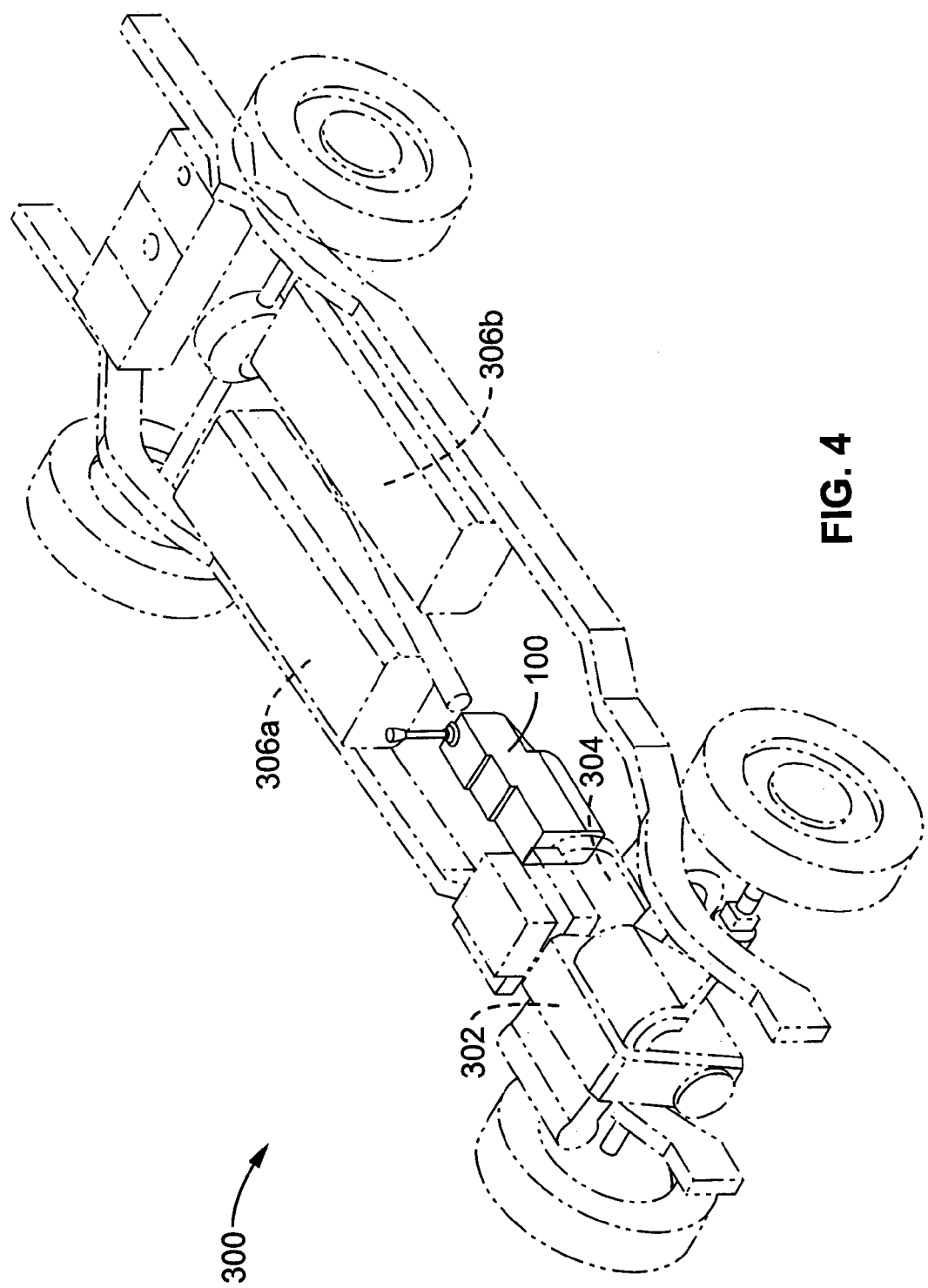
FIG. 4 is a schematic diagram of a hybrid powertrain configuration employing an SICVT according to the present invention.

FIG. 4 schematically illustrates the SICVT 100 placed into an inline hybrid vehicle powertrain configuration 300. The configuration generally comprises the internal combustion engine 302 with a conventional clutch followed by an electric motor 304 which is directly connected to the SICVT 100. This kind of configuration eliminates the need for a torque converter and reverse gear since the electric motor can perform these functions if sized designed appropriately. The engine starter motor can also be eliminated. Regeneration of braking energy is also possible if the weight distribution is appropriate and the road conditions are right. There are two battery packs 306a, 306b shown but this is only by way of illustration. It will be appreciated that the SICVT can be employed in many other vehicle powertrain configurations as well.

Not only is the SICVT of the present invention compact, but the reduction of ratio range of the individual CVTs in an SICVT according to the present invention also allows for construction of stiffer pulleys and reduces the losses caused with large radii differences on the input and output. These two factors combine to further increase the efficiency of the transmission.

Where two CVTs with identical ratios are employed, which is the preferred embodiment of the invention, the ratio range of the individual CVTs need only be the square root of the desired overall ratio range. Hence, a square root reduction in pulley size is achieved. This can be seen by the relationship $R=R1*R2$ where R is the overall ratio range and R1 and R2 are the ratio ranges of the first and second stages, respectively. If R=9:1, then R1 and R2 each equal 3:1. Hence, the ratio and corresponding pully size for each stage is reduced. In addition, piston displacement is the square root of that with a single CVT (singly pulley set) system because each sheave moves a smaller amount of fluid and the total amount of fluid that must be pumped is less. Note also that the ratio ranges of the CVTs do not have to be equal, but can be independent of each other; however, the product relationship of the ratios will still hold.

The foregoing ratio relationship of the stages has several benefits, which include the following:

1. Each stage of the inline CVT can operate closely around the best efficiency point, i.e. one to one.

2. The overall efficiency is not much different than a single stage CVT because the elements are operating at or near the 1:1 high efficiency (97% to 98%) range.

3. The input and output shafts are in line.

4. The CVT dimensions are much smaller laterally but only a little longer longitudinally. In fact the dimensions are almost the same as a manual transmission of equal torque and power ratings.

5. The system can be scaled up to much higher power ranges and much wider ratio ranges. All the way up to class 8 vehicles with 500 kW and 2000 NM of torque and ratio spans of 15 to 20 to one.

6. The speed capability of the CVT is improved over a single stage CVT due to the shorter chains and smaller pulleys.

7. The control system becomes more critical using conventional hydraulic techniques, but using electro-hydraulic systems with PWM servo-motors, the system controls is the same as in a conventional CVT. The power required for control will be on the order of 100 watts or less with hydraulic pressures of over 1500 psi or 100 Bar. The transmission is built symmetrical to reduce part count since many parts are duplicated.

9. For conventional trucks and passenger vehicles the transmission will not require auxiliary cooling due to the efficiency of the transmission elements.

10. The weight of the system can be equivalent to a Manual Transmission of equivalent power and torque.

11. The projected cost of this automatic CVT transmission will be substantially less than the equivalent manual or automatic transmission at any equal manufactured volume.

12. An analysis of the forces show that the idler shaft has all forces contained within itself and the alignment of the shaft is self regulated so as to not require any physical restraint, thus keeping the mechanical efficiency high.

13. The input and output shaft forces are also self-contained and are held in place by the two main ball bearings. All forces on the transmission case are in the direction to resist opposing bearing loads. There is no thrust load in the inline direction as there are in conventional transmissions due to the use of helical gears or torque loading devices.

Control of the SICVT is performed in essentially the same way as with a single stage CVT. The only difference with this control is that displacement of the actuated pulleys results in the square of the original ratio change, which is not an issue for implementation, and that the idler pulley set 112a, 112b and 122 needs no actuation. The input and output pulleys are preferably actuated with hydraulic pistons 120a, 120b (or other mechanical or electromechanical means) to shift.

While conventional CVT controls can be used with the SICVT, a particularly suitable control mechanism and method can be found in co-pending application Ser. No. 10/804,814 filed on Mar. 19, 2004, incorporated herein by reference. A slight variation of that control mechanism and method will now be described by way of example.

Figure 5:
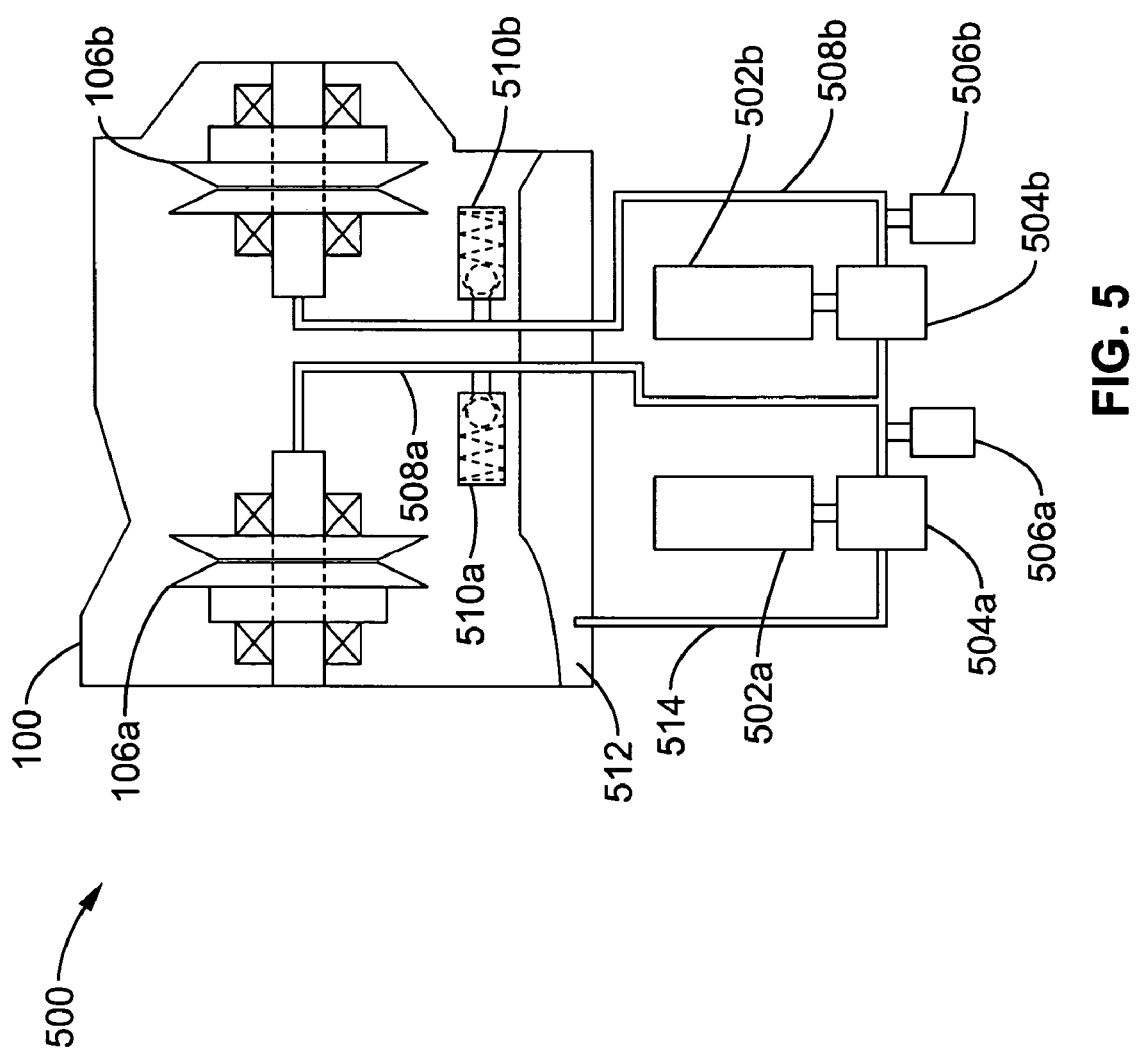
FIG. 5 is a schematic diagram of an embodiment of a servo hydraulic control system for use with the SICVT.

Referring to FIG. 5, a low level control system 500 is used to provide the clamping forces for torque transmission and the shifting forces for SICVT operation. The clamping pressure control system is preferably a servo hydraulic system that creates high pressure with electric servo-motors 502a, 502b and simple bidirectional hydraulic gear pumps 504a, 504b or the equivalent. There are no valves in the control system and there is no need for calibration and valve plates, etc. as in conventional CVT and automatic transmissions. Positive displacement gear pumps are used that are simple and inexpensive to manufacture. These pumps do not need to be high precision since a little leak within the pump generally helps to stabilize the pressure feedback control loops. The calibration is simply in the pressure transducers 506a, 506b that monitor the high pressure hydraulic lines 508a, 508b, respectively, which also include pressure relief valves 510a, 510b, respectively. Hydraulic fluid is drawn from a sump 512 through sump pickup 514.

The clamping forces are created by the pressure feedback servo hydraulic pump system. Only one servo motor pump system for each control pulley is required in this configuration. The clamping pressure control signal for the servo pumps is determined by the commanded torque or power from the vehicle driver or accelerator pedal or brake pedal and the shift rate desired.

In operation, the clamping forces are set before the torque of the engine or traction motor and ratio rate is commanded thus insuring that the proper clamping pressure exist before engine or motor torque is developed. The delay is on the order of milliseconds. This means that the transmission system must command the throttle of the engine and not the other way around as found in conventional vehicles. In other words, the transmission is the master and the engine is the slave.

A second servo-motor pump system can be used to provide shift rate or ratio rate control and to hold ratio. In automatic CVT vehicles, with either conventional or hybrid drives, the ratio is rarely held constant unless needed for things like mountain deceleration or similar applications. Thus it is expedient to use a duplicate servo-motor pump system for shifting as for clamping pressurization.

The clamping pressure and ratio rate or ratio commands are determined by a low level controller described above with inputs from the driver for torque or power commanded. After the controller has the transmission appropriately set as determined by the pressure transducers, the engine or motor prime movers can be commanded by the transmission high level or vehicle dynamics controller. This sequence of action insures that proper clamping pressure exists before a change in torque is applied. Thus the accelerator and brake pedal of the vehicle commands the transmission and not the engine as in conventional vehicles. The transmission pressures signals then will in-turn open the engine throttle or set the electric traction motor torque if a hybrid configuration is used.

The high level control system can then be used to optimize the efficiency of the prime mover. This higher level control also needs to consider the dynamics of the overall vehicle. The equation controlling the vehicle dynamics is:

$$\alpha_{driveshaft} = \frac{\left[-\dot{R}I_e\omega_e + T_eR_e - T_{losses} - T_{drag}\right]}{[I_eR^2 + I_{driveshaft}]}$$

Where:
$\alpha_{driveshaft}$=Acceleration of the driveshaft (proportional to vehicle acceleration)
R=CVT ratio or engine speed/driveshaft speed
$\dot{R}$=CVT ratio rate
$I_{driveshaft}$=vehicle inertia
$I_e$=Engine or CVT input inertia
$T_e$=Engine or input torque to the CVT
$T_{losses}$=CVT losses transferred to the output shaft
$\omega_e$=Engine speed
$T_{drag}$=CVT losses transferred to the driveshaft This equation shows that to control a CVT it is necessary to control two parameters independently. In the mathematics, it is preferred to use "R" for the CVT ratio rather than "i" because of the existence of "$\dot{R}$". The first parameter term is the rate of change of ratio or $\dot{R}$. The second is the torque from the engine or motor. These two independent control parameters determine the instantaneous output torque at the driveshaft which then determines the acceleration of the vehicle and the clamping forces needed to control the low level system. It should be noted that the angular acceleration times the total system inertia at the driveshaft is the output torque of the transmission. This two input parameter system then provides flexibility and constraints for the dynamic control of the vehicle. These two parameters could be a dream or a nightmare for the Optimal control of vehicle dynamics while maximizing fuel efficiency. The important feature is to notice the negative sign of the $\dot{R}$ term. It is in exactly the opposite the direction you would generally like. Thus to go to reduction for acceleration, $\dot{R}$ needs to be positive, but the negative sign on this term means torque is decreased by the rate of change of ratio multiplied by the input momentum. Generally to counteract this term additional torque is needed. For conventional vehicles this can only be done by increased engine torque. This can only be done by operating the engine in a throttled condition so that the extra torque to overcome the $\dot{R}$ term is available. This reduces the maximum possible efficiency of the engine for good vehicle response.

It will be appreciated, therefore, that the present invention encompasses all implementations of CVTs in series. This design can be extended with addition or reduction gears or a planetary train for reverse. The configuration shown in FIG. 2 is particularly suited for use with a hybrid electric vehicle capable of electric reverse and launch, making the reverse gearing and torque converter unnecessary. This simplified transmission makes initial testing and design less complicated. The SICVT, however, should not be considered to be restricted to hybrid electric vehicles. The design may also be used in a transaxle or front wheel drive vehicle application. The benefits to efficiency remain and potential of a tall narrow transmission configuration may prove beneficial for many configurations. It will also be appreciated that the SICVT is small and simpler than a conventional manual transmission having the same ratio range.

As can be seen from the foregoing, the SICVT provides a compact and small CVT that will fit the current manufacturing infrastructure with the capability to adapt to new powertrain configurations of hybrid electric or conventional gasoline or diesel engines. The configuration of an inline CVT can now be used for a wide variety of vehicles constructed with inline engine and transmission configurations as with most trucks and buses in the world. Since the SICVT is approximately the same size as a manual transmission, it can directly replace a manual transmission with the addition a torque converter and a forward/reverse planetary gear set in front of the CVT. Furthermore, an SICVT can be used to convert a conventional transmission vehicle to a hybrid electric simply by adding an electric motor in front of the SICVT, between the engine and SICVT. Thus, the need for a starting device or reverse gear can be eliminated. This flexibility in the use of the SICVT provides vehicle manufacturers the possibility of providing all possible customer choices with one element. Battery size and location can be determined as desired in the hybrids' specification. We prefer the large battery hybrid with a large electric motor and minimum gasoline engine because this gives us the best possible fuel economy and highest possible performance with a CVT.

In addition, the weight of an SICVT design using a van Rooij chain and servo hydraulic controls is only slightly heavier than the same rated manual transmission and the dimensions are only slightly larger. Thus little or no change in vehicle mounting points and engine mountings are required to adapt the SICVT into the vehicle in either conventional or hybrid electric form.

Note also, that the SICVT design has a symmetrical ratio span so that the transmission goes from reduction to overdrive symmetrically. To adapt to most transmissions with a larger reduction and smaller overdrive ratio, a higher reduction final drive axle would be required to maintain the exact performance characteristics of the vehicle. Such a change is not significant in most cases.

Based on the foregoing, it will be further appreciated that the SICVT of the present invention has a number of advantages over conventional CVT approaches, such as small size, use of inline shafts, and increased average efficiency (although peak efficiency may be slightly lower). Because of the use of inline shafts, longitudinal implementation is possible. Furthermore, several factors lead to increased efficiency, such as: smaller individual ratio range allows use of a narrower chain for a specific transmitted load; smaller outer diameter pulleys increase effective stiffness which reduces losses due to radial slip on the sheaves; and larger minimum radius of the pulley reduces pulley skew and the losses attributed to this deformation.

Note also that, while the secondary chain/belt pulley set will carry more load, the clamping force is simply increased slightly to accommodate this increased load. Chain or belt efficiency is not greatly affected when using high efficiency chain elements.

Further note, that the SICVT provides for the use of smaller diameter pulleys than in a conventional CVT having the same ratio range. A smaller diameter also means higher speed capability because centrifugal forces are reduced and, therefore, higher power can be transmitted.

It will also be appreciated that two, three or more CVTs can be connected in series within the scope of the present invention and that multiple modules can be connected in series as well. For example, referring to FIG. 6, an embodiment of a three stage SICVT is shown. Here we have two control pulleys 106a, 106b which are actuated by pistons 120a, 120b, respectively, four idler pulleys 112a, 112b, 112c and 112d, and two idler pulley wheels 122a, 122b. For three equal stages, the ratio range for each stage becomes $\sqrt[3]{R}$ where R is the overall ratio range of the SICVT. Similarly, the pulley dimensions and piston displacement scale in the same manner. Note that there is an offset from the input and output shafts being exactly inline in the three-stage SICVT configuration shown in FIG. 6. However, due to the fact that smaller pulleys can be used, the offset amount can be sufficiently small for the configuration to be considered and "effectively inline" configuration.

Figure 6:
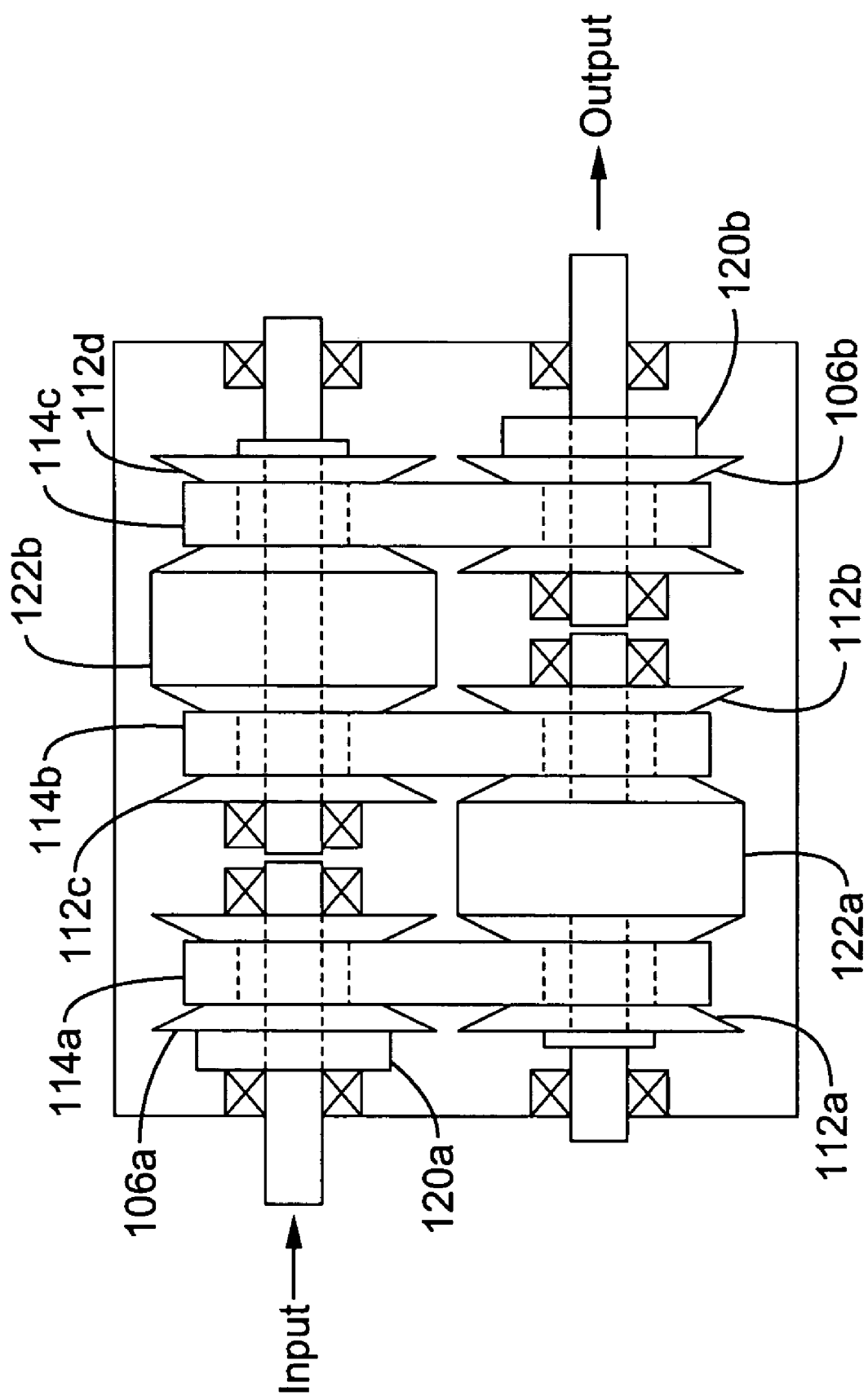
FIG. 6 is a schematic diagram of a side view of an embodiment of a three-stage SICVT according to the present invention in which the stages are in a planar (straight) configuration and the input and output shafts are offset.
Figure 8:
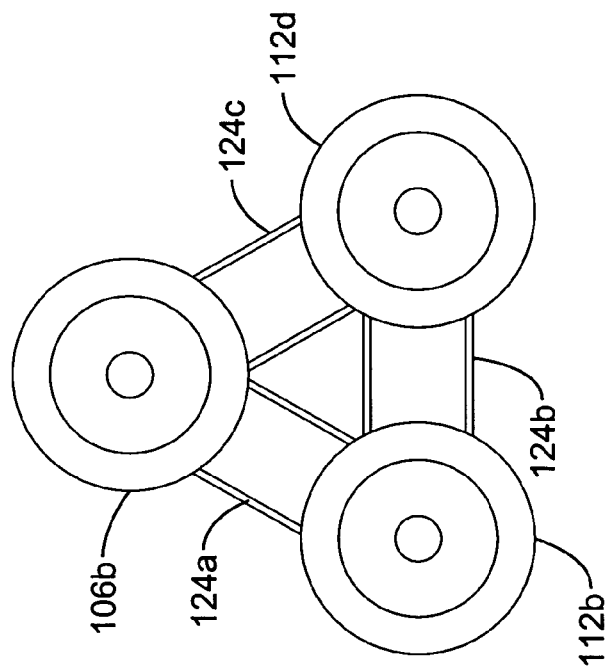
FIG. 8 is a schematic front view of the three-stage SICVT shown in FIG. 7.
Figure 7:
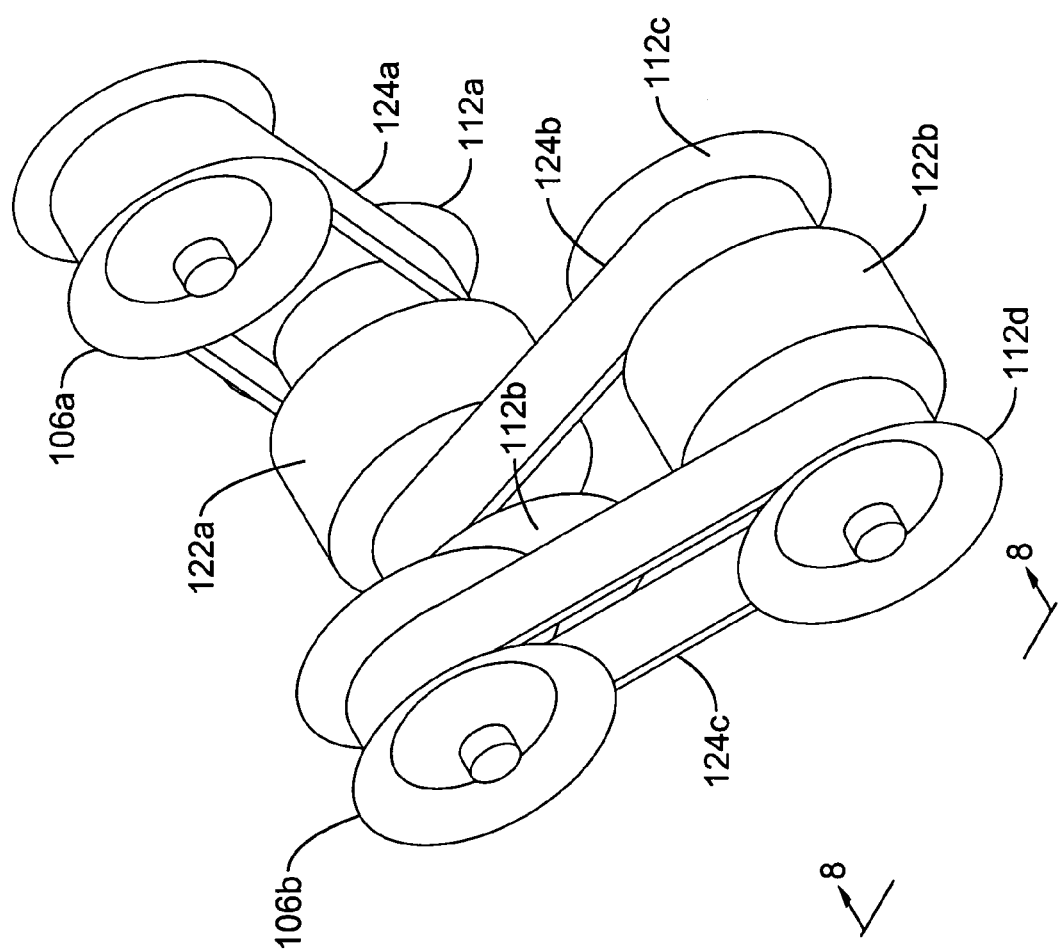
FIG. 7 is a schematic perspective view of an alternative embodiment of the three-stage SICVT of FIG. 6 wherein the stages are in a triangular configuration and the input and output shafts are inline.

Referring now to FIG. 7 and FIG. 8, it is also possible to configure a three-stage SICVT such that the input and output shafts are inline. This can be done by positioning the CVT stages in a triangular formation rather than an inline formation as shown in FIG. 6. This allows the input and output shafts to be brought into alignment as shown.

Hence, for the input and output shafts to be exactly inline in an SICVT, there needs to be an even number of CVT stages connected in series (e.g., 2, 4, 6, etc.) or, alternatively, a three-stage triangular configuration can be employed. It may also be possible to bring inline the input and output shafts of an SICVT having an odd number of CVT stages by positioning the stages geometrically in a similar manner as shown for the three-stage configuration in FIG. 7 and FIG. 8.

Therefore, while the input and output shafts in the present invention are preferably inline so that the invention can be used as a direct replacement for an existing conventional transmission in a vehicle, it will also be appreciated that the present invention contemplates configurations where the input and output shafts are not inline but are parallel with small offsets. Since the present invention allows for a reduction in pulley size, the center-to-center distance between the parallel shafts can be reduced. Therefore, the present invention provides for the flexibility to set the position of parallel shafts including positioning the shafts inline.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A continuously variable transmission apparatus, comprising:
    a first continuously variable transmission stage connected in series with a second continuously variable transmission stage;
    said series connected continuously variable transmission stages having an input shaft and an output shaft;
    said output shaft positioned inline with said input shaft;
    a low level control system configured for providing clamping forces for torque transmission and shifting forces for operation of said apparatus;
    said low level control system configured to command a high level control system for operation of an engine or other prime mover in a vehicle;
    wherein said low level control system is configured such that an accelerator pedal and brake pedal of a vehicle commands said apparatus and not the engine or prime mover;
    wherein each said continuously variable transmission stage includes a control pulley and an idler pulley;
    wherein each said continuously variable transmission stage includes a single input line actuation mechanism for applying clamping pressure to its control pulley; and
    an idler pulley wheel configured to slide along a shaft such that said idler pulleys do not require an actuation mechanism.

2. An apparatus as recited in claim 1:
    said control pulley of said first continuously variable transmission stage having said input shaft;
    said control pulley of said second continuously variable transmission stage having said output shaft;
    said idler pulley of said second continuously variable transmission stage connected to said idler pulley of said first continuously variable transmission stage.

3. An apparatus as recited in claim 2, wherein said idler pulley of said second continuously variable transmission stage is connected to said idler pulley of said first continuously variable transmission stage by a common shaft.

4. An apparatus as recited in claim 3, further comprising:
    an idler pulley wheel positioned between at least two of said idler pulleys;
    wherein said idler pulley wheel is configured to move along said common shaft in response to actuation of at least one of said control pulleys.

5. An apparatus as recited in claim 1:
    wherein each said continuously variable transmission stage has a ratio range;
    wherein each said ratio range is independent; and
    wherein said apparatus has a ratio range equal to the mathematical product of said ratio ranges of said continuously variable transmission stages.

6. An apparatus as recited in claim 1:
    wherein said apparatus has two continuously variable transmission stages;
    wherein said continuously variable transmission stages have approximately equal ratio ranges;
    wherein said apparatus has a ratio range; and
    wherein each said continuously variable transmission stage has a ratio range approximately equal to the mathematical square root of said ratio range of said apparatus.

7. An apparatus as recited in claim 1:
    wherein said apparatus has two continuously variable transmission stages;
    wherein said continuously variable transmission stages have approximately equal ratio ranges;
    wherein said apparatus has a ratio range;
    and wherein each said continuously variable transmission stage has a pulley size approximately equal to the mathematical square root of the pulley size in a single continuously variable transmission having a ratio range of said apparatus.

8. An apparatus as recited in claim 1, wherein said actuation mechanisms comprise hydraulic pistons.

9. An apparatus as recited in claim 1, wherein said actuation mechanisms comprise mechanical or electromechanical mechanisms.

10. An apparatus as recited in claim 1, wherein actuation and displacement of said control pulleys results in an apparatus ratio change up to the mathematical square of the ratio change of said continuously variable transmission stages.

11. An apparatus as recited in claim 1:
    wherein said continuously variable transmission stages have approximately equal ratio ranges; and
    wherein displacement of each said control pulley is approximately equal to the mathematical square root of displacement in a single continuously variable transmission having a ratio range of said apparatus.

12. A continuously variable transmission apparatus, comprising:
    a first continuously variable transmission stage;
    a second continuously variable transmission stage connected in series with said first continuously variable transmission stage;

each said continuously variable transmission stage having a first pulley configured for actuation by a hydraulic piston;

each said continuously variable transmission having a second pulley;

said second pulley of said second continuously variable transmission stage connected to said second pulley of said first continuously variable transmission stage through a shaft;

said first pulley of said first continuously variable transmission stage coupled to an input shaft;

said first pulley of said second continuously variable transmission stage coupled to an output shaft;

said output shaft positioned inline with said input shaft;

a low level control system configured for providing clamping forces for torque transmission and shifting forces for operation of said apparatus;

said low level control system configured to command a high level control system for operation of an engine or other prime mover in a vehicle;

wherein said low level control system is configured such that an accelerator pedal and brake pedal of a vehicle commands said apparatus and not the engine or prime mover;

wherein said first pulleys comprise control pulleys;

wherein said second pulleys comprise idler pulleys;

wherein each said continuously variable transmission stage includes a single input line actuation mechanism for applying clamping pressure to its control pulley; and an idler pulley wheel configured to slide along a shaft such that said idler pulleys do not require an actuation mechanism.

13. An apparatus as recited in claim 12, further comprising:

an idler pulley wheel positioned between said idler pulleys;

wherein said idler pulley wheel is configured to move along said shaft connecting said idler pulleys in response to actuation of at least one of said first pulleys.

14. An apparatus as recited in claim 12:

wherein each said continuously variable transmission stage has a ratio range;

wherein each said ratio range is independent; and wherein said apparatus has a ratio range equal to the mathematical product of said ratio ranges of said continuously variable transmission stages.

15. An apparatus as recited in claim 12:

wherein said apparatus has two continuously variable transmission stages;

wherein said continuously variable transmission stages have approximately equal ratio ranges;

wherein said apparatus has a ratio range; and wherein each said continuously variable transmission stage has a ratio range approximately equal to the mathematical square root of said ratio range of said apparatus.

16. An apparatus as recited in claim 12:

wherein said apparatus has two continuously variable transmission stages;

wherein said continuously variable transmission stages have approximately equal ratio ranges;

wherein said apparatus has a ratio range;

and wherein each said continuously variable transmission stage has a pulley size approximately equal to the mathematical square root of the pulley size in a single continuously variable transmission having a ratio range of said apparatus.

17. An apparatus as recited in claim 12, wherein said actuation mechanisms comprise hydraulic pistons.

18. An apparatus as recited in claim 12, wherein said actuation mechanisms comprise mechanical or electromechanical mechanisms.

19. An apparatus as recited in claim 12, wherein actuation and displacement of said first pulleys results in an apparatus ratio change up to the mathematical square of the ratio change of said continuously variable transmission stages.

20. An apparatus as recited in claim 12:

wherein said continuously variable transmission stages have approximately equal ratio ranges; and wherein displacement of each said first pulley is approximately equal to the mathematical square root of displacement in a single continuously variable transmission having a ratio range of said apparatus.

21. A continuously variable transmission apparatus, comprising:

a first continuously variable transmission stage;

a second continuously variable transmission stage connected in series with said first continuously variable transmission stage;

each said continuously variable transmission stage having a control pulley and an idler pulley;

said idler pulley of said second continuously variable transmission stage connected to said idler pulley of said first continuously variable transmission stage through a common shaft;

said control pulley of said first continuously variable transmission having an input shaft;

said control pulley of said second continuously variable transmission having an output shaft;

said output shaft positioned inline with said input shaft;

a low level control system configured for providing clamping forces for torque transmission and shifting forces for operation of said apparatus;

said low level control system configured to command a high level control system for operation of an engine or other prime mover in a vehicle;

wherein said low level control system is configured such that an accelerator pedal and brake pedal of a vehicle commands said apparatus and not the engine or prime mover;

wherein each said continuously variable transmission stage includes a single input line actuation mechanism for applying clamping pressure to its control pulley; and an idler pulley wheel configured to slide along a shaft such that said idler pulleys do not require an actuation mechanism.

22. An apparatus as recited in claim 21, further comprising:

an idler pulley wheel positioned between said idler pulleys;

wherein said idler pulley wheel is configured to move along said shaft connecting said idler pulleys in response to actuation of at least one of said first pulleys.

23. An apparatus as recited in claim 21:

wherein each said continuously variable transmission stage has a ratio range;

wherein each said ratio range is independent; and wherein said apparatus has a ratio range equal to the mathematical product of said ratio ranges of said continuously variable transmission stages.

24. An apparatus as recited in claim 21:
   wherein said apparatus has two continuously variable transmission stages;
   wherein said continuously variable transmission stages have approximately equal ratio ranges;
   wherein said apparatus has a ratio range; and
   wherein each said continuously variable transmission stage has a ratio range approximately equal to the mathematical square root of said ratio range of said apparatus.

25. An apparatus as recited in claim 21:
   wherein said apparatus has two continuously variable transmission stages;
   wherein said continuously variable transmission stages have approximately equal ratio ranges;
   wherein said apparatus has a ratio range;
   and wherein each said continuously variable transmission stage has a pulley size approximately equal to the mathematical square root of the pulley size in a single continuously variable transmission having a ratio range of said apparatus.

26. An apparatus as recited in claim 21, wherein said actuation mechanisms comprise at least one hydraulic piston.

27. An apparatus as recited in claim 21, wherein said actuation mechanisms comprise at least one mechanical or electromechanical mechanism.

28. An apparatus as recited in claim 21, wherein actuation and displacement of said control pulleys results in an apparatus ratio change up to the mathematical square of the ratio change of said continuously variable transmission stages.

29. An apparatus as recited in claim 21:
   wherein said continuously variable transmission stages have approximately equal ratio ranges; and
   wherein displacement of each said control pulley is approximately equal to the mathematical square root of displacement in a single continuously variable transmission having a ratio range of said apparatus.

30. A continuously variable transmission apparatus, comprising:
   a first pulley;
   a second pulley;
   a third pulley; and
   a fourth pulley;
   said first pulley configured for actuation and coupled to an input shaft;
   said second pulley coupled to said first pulley through a chain or belt;
   said fourth pulley configured for actuation and coupled to an output shaft;
   said third pulley coupled to said fourth pulley through a chain or belt;
   said second pulley connected to said third pulley by a shaft;
   said output shaft positioned inline with said input shaft;
   a low level control system configured for providing clamping forces for torque transmission and shifting forces for operation of said apparatus;
   said low level control system configured to command a high level control system for operation of an engine or other prime mover in a vehicle;
   wherein said low level control system is configured such that an accelerator pedal and brake pedal of a vehicle commands said apparatus and not the engine or prime mover;
   wherein said first and fourth pulleys comprise first and second control pulleys, respectively;
   wherein said second and third pulleys comprise idler pulleys;
   a single input line actuation mechanism for applying clamping pressure to said first control pulley;
   a single input line actuation mechanism for applying clamping pressure to said second control pulley; and
   an idler pulley wheel configured to slide along a shaft such that said idler pulleys do not require an actuation mechanism.

31. An apparatus as recited in claim 30, wherein at least one of said second and third pulleys is configured for actuation for improved efficiency.

32. An apparatus as recited in claim 30, further comprising:
   an idler pulley wheel positioned between said idler pulleys;
   wherein said idler pulley wheel is configured to move along said shaft connecting said idler pulleys in response to actuation of at least one of said first and fourth pulleys.

33. An apparatus as recited in claim 30:
   wherein said apparatus has two continuously variable transmission stages;
   wherein said continuously variable transmission stages have approximately equal ratio ranges;
   wherein said apparatus has a ratio range; and
   wherein each said continuously variable transmission stage has a ratio range approximately equal to the mathematical square root of said ratio range of said apparatus.

34. An apparatus as recited in claim 30:
   wherein said apparatus has two continuously variable transmission stages;
   wherein said continuously variable transmission stages have approximately equal ratio ranges;
   wherein said apparatus has a ratio range;
   and wherein each said continuously variable transmission stage has a pulley size approximately equal to the mathematical square root of the pulley size in a single continuously variable transmission having a ratio range of said apparatus.

35. An apparatus as recited in claim 30:
   wherein said apparatus has two continuously variable transmission stages;
   wherein each said continuously variable transmission stage has a ratio range;
   wherein each said ratio range is independent; and
   wherein said apparatus has a ratio range equal to the mathematical product of said ratio ranges of said continuously variable transmission stages.

36. An apparatus as recited in claim 30, further comprising means for actuating said first and fourth pulleys for shifting.

37. An apparatus as recited in claim 36, wherein said means comprises hydraulic pistons.

38. An apparatus as recited in claim 36, wherein said means comprises mechanical or electromechanical mechanisms.

39. A continuously variable transmission apparatus, comprising:
   at least two continuously variable transmission stages connected in series;
   said series connected continuously variable transmission stages having an input shaft and an output shaft;

wherein said output shaft is axially offset from said input shaft;
a low level control system configured for providing clamping forces for torque transmission and shifting forces for operation of said apparatus;
said low level control system configured to command a high level control system for operation of an engine or other prime mover in a vehicle;
said low level control system configured such that an accelerator pedal and brake pedal of a vehicle commands said apparatus and not the engine or prime mover.

40. A continuously variable transmission apparatus, comprising:
a first continuously variable transmission stage;
a second continuously variable transmission stage;
each said continuously variable transmission stage having a first pulley configured for actuation by a hydraulic piston;
each said continuously variable transmission having a second pulley;
said second pulley of said second continuously variable transmission stage connected to said second pulley of said first continuously variable transmission stage through a shaft;
said first pulley of said first continuously variable transmission stage coupled to an input shaft;
said first pulley of said second continuously variable transmission stage coupled to an output shaft;
wherein said output shaft is axially offset from said input shaft;
a low level control system configured for providing clamping forces for torque transmission and shifting forces for operation of said apparatus;
said low level control system configured to command a high level control system for operation of an engine or other prime mover in a vehicle;
wherein said low level control system is configured such that an accelerator pedal and brake pedal of a vehicle commands said apparatus and not the engine or prime mover.

41. A continuously variable transmission apparatus, comprising:
a first continuously variable transmission stage;
a second continuously variable transmission stage;
each said continuously variable transmission stage having a control pulley and an idler pulley;
said idler pulley of said second continuously variable transmission stage connected to said idler pulley of said first continuously variable transmission stage through a common shaft;
said control pulley of said first continuously variable transmission having an input shaft;
said control pulley of said second continuously variable transmission having an output shaft;
wherein said output shaft is axially offset from said input shaft;
a low level control system configured for providing clamping forces for torque transmission and shifting forces for operation of said apparatus;
said low level control system configured to command a high level control system for operation of an engine or other prime mover in a vehicle;
wherein said low level control system is configured such that an accelerator pedal and brake pedal of a vehicle commands said apparatus and not the engine or prime mover.

42. A continuously variable transmission apparatus, comprising:
a first pulley;
a second pulley;
a third pulley; and
a fourth pulley;
said first pulley configured for actuation and coupled to an input shaft;
said second pulley coupled to said first pulley through a chain or belt;
said fourth pulley configured for actuation and coupled to an output shaft;
said third pulley coupled to said fourth pulley through a chain or belt;
said second pulley connected to said third pulley by a shaft;
wherein said output shaft is axially offset from said input shaft;
a low level control system configured for providing clamping forces for torque transmission and shifting forces for operation of said apparatus;
said low level control system configured to command a high level control system for operation of an engine or other prime mover in a vehicle;
wherein said low level control system is configured such that an accelerator pedal and brake pedal of a vehicle commands said apparatus and not the engine or prime mover.

43. A continuously variable transmission apparatus, comprising:
a first continuously variable transmission stage;
a second continuously variable transmission stage;
a third continuously variable transmission stage;
said second continuously variable transmission stage connected in series with said first continuously variable transmission stage;
said third continuously variable transmission stage connected in series with said second continuously variable transmission stage;
said first continuously variable transmission stage having an input shaft;
said third continuously variable transmission stage having an output shaft;
said output shaft positioned inline with said input shaft,
wherein said continuously variable transmission stages have approximately equal ratio ranges; wherein said apparatus has a ratio range; and wherein each said continuously variable transmission stage has a pulley size approximately equal to the mathematical cube root of the pulley size in a single continuously variable transmission having a ratio range of said apparatus.

44. An apparatus as recited in claim 43:
wherein said first continuously variable transmission stage has a control pulley and an idler pulley;
said control pulley of said first continuously variable transmission stage having said input shaft;
wherein said second continuously variable transmission stage has first and second idler pulleys;
wherein said third continuously variable transmission has a control pulley and an idler pulley;
said control pulley of said third continuously variable transmission stage having said output shaft; and
said idler pulley of said first continuously variable transmission stage connected to said second idler pulley of said second continuously variable transmission stage;

said idler pulley of said third continuously variable transmission stage connected to said first idler pulley of said second continuously variable transmission stage.

45. An apparatus as recited in claim 43:
wherein each said continuously variable transmission stage has a ratio range;
wherein each said ratio range is independent; and
wherein said apparatus has a ratio range equal to the mathematical product of said ratio ranges of said continuously variable transmission stages.

46. An apparatus as recited in claim 43:
wherein said continuously variable transmission stages have approximately equal ratio ranges;
wherein said apparatus has a ratio range; and
wherein each said continuously variable transmission stage has a ratio range approximately equal to the mathematical cube root of said ratio range of said apparatus.

47. An apparatus as recited in claim 43, further comprising means for actuating said control pulleys for shifting.

48. An apparatus as recited in claim 47, wherein said means comprises hydraulic pistons.

49. An apparatus as recited in claim 47, wherein said means comprises mechanical or electromechanical mechanisms.

50. An apparatus as recited in claim 43: wherein said continuously variable transmission stages have approximately equal ratio ranges; and
wherein actuation and displacement of said control pulleys results in an apparatus ratio change up to the mathematical cube of the ratio change of said continuously variable transmission stages.

51. An apparatus as recited in claim 43:
wherein said continuously variable transmission stages have approximately equal ratio ranges; and
wherein displacement of each said control pulley is approximately equal to the mathematical cube root of displacement in a single continuously variable transmission having a ratio range of said apparatus.

* * * * *